United States Patent
Boudreault et al.

(10) Patent No.: US 7,837,961 B2
(45) Date of Patent: Nov. 23, 2010

(54) PROCESSES FOR EXTRACTING ALUMINUM AND IRON FROM ALUMINOUS ORES

(75) Inventors: Richard Boudreault, Ville St-Laurent (CA); Serge Alex, Quebec (CA); Fabienne Sotto, Outremont (CA)

(73) Assignee: Exploration Orbite VSPA Inc., Montreal, Quebec (CA)

( * ) Notice: Subject to any disclaimer, the term of this patent is extended or adjusted under 35 U.S.C. 154(b) by 0 days.

(21) Appl. No.: 12/601,079

(22) PCT Filed: May 7, 2008

(86) PCT No.: PCT/CA2008/000877

§ 371 (c)(1),
(2), (4) Date: Nov. 20, 2009

(87) PCT Pub. No.: WO2008/141423

PCT Pub. Date: Nov. 27, 2008

(65) Prior Publication Data

US 2010/0150799 A1    Jun. 17, 2010

Related U.S. Application Data

(60) Provisional application No. 60/939,254, filed on May 21, 2007.

(51) Int. Cl.
*C01F 7/00* (2006.01)

(52) U.S. Cl. ............... 423/112; 423/132; 423/139; 423/140; 423/141; 423/142; 423/146

(58) Field of Classification Search ............... 423/112, 423/132, 139, 140–147
See application file for complete search history.

(56) References Cited

U.S. PATENT DOCUMENTS

| | | | |
|---|---|---|---|
| 3,211,521 A | 10/1965 | George et al. | |
| 3,473,919 A | 10/1969 | Metcalfe et al. | |
| 3,545,920 A | 12/1970 | George et al. | |
| 3,586,477 A | 6/1971 | Flood | |
| 3,966,909 A | 6/1976 | Grunig et al. | |
| 4,069,296 A | 1/1978 | Huang | |
| 4,110,399 A | 8/1978 | Gaudernack et al. | |
| 4,124,680 A | 11/1978 | Cohen et al. | |
| 4,237,102 A | 12/1980 | Cohen et al. | |
| 4,362,703 A | 12/1982 | Boybay et al. | |
| 4,567,026 A | 1/1986 | Lisowyj | |
| 4,741,831 A | 5/1988 | Grinstead | |
| 5,868,935 A * | 2/1999 | Sirkar et al. ............ 210/643 |

FOREIGN PATENT DOCUMENTS

| | | |
|---|---|---|
| CA | 1176470 | 10/1984 |
| WO | WO 2005/123591 | 12/2005 |

OTHER PUBLICATIONS

Smirnov, V., "Alumina production in Russia Part I: Historical background", Journal of Materials, vol. 48, Issue 8, 1996, pp. 24-26.
Wei, X. et al., "Recovery of Iron and Aluminum from Acid Mine Drainage by selective precipitation", Environmental Engineering Science, vol. 22, No. 6, 2005, pp. 745-755.

* cited by examiner

*Primary Examiner*—Steven Bos
(74) *Attorney, Agent, or Firm*—Bereskin & Parr LLP/S E N C R L, s r l

(57) ABSTRACT

There are provided processes for extracting aluminum ions from aluminous ores. Such processes can be used with various types of aluminous ores such as aluminous ores comprising various types of metals such as Fe, K, Mg, Na, Ca, Mn, Ba, Zn, Li, Sr, V, Ni, Cr, Pb, Cu, Co, Sb, As, B, Sn, Be, Mo, or mixtures thereof.

24 Claims, 1 Drawing Sheet

PROCESSES FOR EXTRACTING ALUMINUM AND IRON FROM ALUMINOUS ORES

Cross-Reference to Related Applications

This application is a 35 USC 371 national stage entry of PCT/CA2008/000877 filed on May 7, 2008 and which claims priority from U.S. provisional application No. 60/939,254 filed on May 21, 2007. These documents are hereby incorporated by reference in their entirety.

TECHNICAL FIELD

The present invention relates to improvements in the field of chemistry applied to extraction of aluminum from aluminous ores. For example, such processes are useful for extracting aluminum from aluminous ores comprising various types of metals such as Fe, K, Mg, Na, Ca, Mn, Ba, Zn, Li, Sr, V, Ni, Cr, Pb, Cu, Co, Sb, As, B, Sn, Be, Mo, or mixtures thereof.

BACKGROUND OF THE INVENTION

More than 96% of the alumina which is produced worldwide is obtained from bauxite, which is a mineral that is particularly rich in alumina (40-60%) and whose main suppliers are from Jamaica, Australia, Brazil, Africa and Russia. In certain areas of the world there are large quantities of aluminous ores, which are aluminosilicates (for example argillite, nepheline, etc.) that are relatively rich in alumina (20-28%). However such areas have received little attention up to now because the production costs for extracting aluminum from such ores remained too high. In these aluminous materials, and contrary to bauxite, aluminum oxide is associated with silicated or sulfated phases. Thus, the Bayer process cannot be used, which means that alternative treatments for the production of alumina must be used or developed. Various processes have been proposed so far in order to extract aluminum from such aluminous ores comprising aluminosilicates but there is still room for improvement or for alternative routes.

SUMMARY OF THE INVENTION

According to one aspect, there is provided a process for extracting aluminum ions from a mixture comprising iron ions and the aluminum ions. The process comprises recovering the aluminum ions from a composition comprising the aluminum ions, the iron ions, an organic solvent and an extracting agent adapted to form an organometallic complex substantially selectively with the iron ions or with the aluminum ions which is soluble in the organic solvent.

According to one embodiment, the composition can comprise an acidic aqueous phase comprising aluminum ions and an organic phase comprising iron ions complexed with the extracting agent and wherein the aluminum ions are recovered by separating the aqueous phase from the organic phase. The aqueous phase can have a pH of about 1 to about 2.5 or of about 2. The extracting agent can be chosen from phosphoric acids and derivatives thereof, and phosphinic acids and derivatives thereof. For example, the extracting agent can be chosen from di-2-ethylhexyl phosphoric acid (HDEHP), bis (2,4,4-trimethylpentyl) phosphinic acid and 2-ethylhexyl phosphonic acid mono-2-ethylhexyl ester. The extracting agent can have a concentration of about 0.5 M to about 1.5 M in the organic phase or of about 1 M in the organic phase. The composition can have a volumic ratio organic phase:aqueous phase of about 1:1. After extraction (passing the composition through the membrane), the aqueous phase can be separated from the organic phase, and the aluminum ions can recovered in the aqueous phase and the aqueous phase can be treated with a base (for example NaOH, KOH, or a mixture thereof). The aqueous phase can be treated with the base so as to obtain a pH of at least about 4. The process can further comprise treating the organic phase with HCl and isolating the iron ions in the form of $Fe^{3+}$.

According to another embodiment, the composition can comprise an acidic aqueous phase comprising iron ions and an organic phase comprising aluminum ions complexed with the extracting agent, and wherein the aluminum ions are recovered by separating the aqueous phase from the organic phase. The aqueous phase can have a pH of about 2.5 to about 3.5. The extracting agent can be a phosphinic acid or a derivative thereof. For example, the extracting agent can be bis(2, 4,4-trimethylpentyl) phosphinic acid. The extracting agent can have a concentration of about 10% to about 25% v/v with respect to the organic solvent or of about 20% v/v with respect to the organic solvent. The composition can have a volumic ratio aqueous phase:organic phase of about 1:1 to about 1:3. During the process, the composition can be at a temperature of about 30° C. to about 50° C. or at a temperature of about 35° C. to about 45° C. After extraction through the membrane, the aqueous phase can be separated from the organic phase. The complexed aluminum ions can be recovered in the organic phase. The organic phase can then be treated with HCl so as to obtain an aqueous composition comprising the aluminum ions.

For example, the organic solvent can be chosen from hydrocarbons. For example, the organic solvent can be chosen from $C_5$-$C_{12}$ alkanes and mixtures thereof. The organic solvent can also be hexane or heptane. The organic phase and the aqueous phase can be separated by means of a filtration membrane, for example a hollow fiber membrane. Such membrane can comprise polypropylene, polyvinylidene difluoride, or a mixture thereof. The aqueous phase can be treated with the base so as to obtain a pH of at least about 4. The process can also further comprise a separation by filtration so as to obtain $Al(OH)_3$. The process can also comprise washing the $Al(OH)_3$. The process can also comprise converting $Al(OH)_3$ into $Al_2O_3$. Conversion of $Al(OH)_3$ into $Al_2O_3$ can be carried out at a temperature of about 800° C. to about 1200° C.

According to another aspect there is provided a composition comprising aluminum ions, iron ions, an organic solvent and an extracting agent adapted to form an organometallic complex substantially selectively with the iron ions or with the aluminum ions which is soluble in the organic solvent.

According to another aspect, there is provided a composition comprising an acidic aqueous phase comprising aluminum ions and an organic phase comprising iron ions complexed with an extracting agent.

According to another aspect, there is provided a composition comprising an acidic aqueous phase comprising iron ions and an organic phase comprising aluminum ions complexed with an extracting agent.

The various parameters, embodiments and examples previously described concerning the processes can also be applied, when possible, to these compositions.

According to another aspect, there is provided a process for at least partially separating aluminum ions from iron ions comprised in a composition, the process comprising substantially selectively precipitating at least a portion of the iron ions in basic conditions in which the pH is of at least 10. The iron ions can be precipitated from a basic aqueous composition comprising NaOH or KOH. For example, the base can be reacted with the composition so as to obtain a mixture in which the pH is of at least 10, and then, the at least portion of precipitated iron ions can be separated from the rest of the mixture. For example, the precipitated iron ions can be separated from the rest of the mixture by carrying out a filtration, a decantation, a centrifugation, or combinations thereof. The process can further comprise rinsing the obtained precipitated iron ions with a basic solution. The basic solution can have a concentration of about 0.01 M to about 0.02 M. The pH can be at least 11, at least 12, about 10.8 to about 11.2, or about 11.5 to about 12.5. The process can further comprise purifying the precipitated iron ions by means of a hollow fiber membrane.

According to another aspect, there is provided a process for extracting aluminum from an aluminum ore, the process comprising:

leaching the aluminum ore with an acid so as to obtain a leachate and a solid residue;

removing at least a portion of iron ions contained in the leachate by:

(i) substantially selectively precipitating the at least portion of the iron ions in basic conditions in which the pH is of at least 10, so as to obtain an aluminum enriched composition; or (ii) substantially selectively complexing the at least portion of the iron ions with an extracting agent adapted to form an organometallic complex substantially selectively with the iron ions so as to obtain an aluminum enriched composition.

For example, the acid can be HCl. The aluminum ore can leached with HCl at a temperature of at least 80° C., at least 90° C., or about 100° C. to about 110° C. HCl can have a concentration of about 6 M. The aluminum ore/acid ratio can be about 1/10 in weight by volume.

For example, the removal of the at least portion of iron ions can be carried out by precipitating the iron ions from a basic aqueous composition. The composition can comprise comprising NaOH or KOH.

For example, the removal of the at least portion of iron ions can be carried out by reacting the leachate with a base in order to obtain a pH of at least 10 and precipitating the iron ions.

For example, the precipitated iron ions can be separated from the rest of the leachate by carrying out a filtration, a decantation, a centrifugation, or mixtures thereof.

The process can further comprise rinsing the obtained precipitated iron ions with a basic solution. The basic solution can have a concentration of about 0.01 M to about 0.02 M. The pH can be at least 11, at least 12, about 10.8 to about 11.2, or about 11.5 to about 12.5. The process can further comprise purifying the precipitated iron ions by means of a hollow fiber membrane.

The removal of the at least portion of iron ions can be carried out by reacting the leachate, under acidic conditions, with the extracting agent and an organic solvent in order to obtain a composition comprising an acidic aqueous phase comprising aluminum ions and an organic phase comprising iron ions complexed with the extracting agent. The aluminum enriched composition can be obtained by separating the aqueous phase from the organic phase. The aqueous phase can have a pH of about 1 to about 2.5, or about 2. The extracting agent can be chosen from di-2-ethylhexyl phosphoric acid (HDEHP), bis(2,4,4-trimethylpentyl) phosphinic acid and 2-ethylhexyl phosphonic acid mono-2-ethylhexyl ester). The extracting agent can have a concentration of about 0.5 M to about 1.5 M in the organic phase or about 1 M in the organic phase.

For example, the organic solvent can be chosen from $C_5$-$C_{12}$ alkanes and mixtures thereof. The organic solvent can be heptane. The composition can have a volumic ratio organic phase:aqueous phase of about 1:1. The organic phase and the aqueous phase can be separated by means of a filtration membrane. The membrane can be a hollow fiber membrane. The membrane can comprise polypropylene, polyvinylidene difluoride, or a mixture thereof.

After passing the composition through the membrane, the aqueous phase can separated from the organic phase. The aluminum ions can be recovered in the aqueous phase and the aqueous phase is treated with a base (such as NaOH or KOH). The aqueous phase can be treated with the base so as to obtain a pH of at least about 4. The process can further comprise a separation by filtration to obtain $Al(OH)_3$, which can be eventually washed.

For example, the aluminum ore can be crushed and roasted before being leached.

For example, before removal of the iron ions, the leachate is treated with a base.

For example, before removal of the iron ions, the leachate can be distilled so as to reduce its volume.

For example, the process can further comprise at least partially recovering the aluminum ions present in the aluminum enriched composition.

For example, the aluminum enriched composition can be treated with an extracting agent adapted to form an organometallic complex substantially selectively with the aluminum ions in the presence of an organic solvent and an acid solution in order to form a composition comprising an acidic aqueous phase comprising impurities and an organic phase comprising aluminum ions complexed with the extracting agent. The aluminum ions can be recovered by separating the aqueous phase from the organic phase. For example, the aqueous phase can have a pH of about 2.5 to about 3.5. The extracting agent can be a phosphinic acid or a derivative thereof. The extracting agent can be bis(2,4,4-trimethylpentyl) phosphinic acid. The extracting agent can have a concentration of about 10% to about 25% v/v or about 20% v/v with respect to the organic solvent. The organic solvent can be chosen from $C_5$-$C_{12}$ alkanes and mixtures thereof. The organic solvent can be heptane. The composition can have a volumic ratio aqueous phase:organic phase of about 1:1 to about 1:3. The organic phase and the aqueous phase can be separated by means of a membrane (for example a hollow fiber membrane). The membrane can comprise polypropylene, polyvinylidene difluoride, or a mixture thereof. The composition can be at a temperature of about 30° C. to about 50° C., or about 35° C. to about 45° C. After passing the composition through the membrane, the aqueous phase can be separated from the organic phase. The complexed aluminum ions can be recovered in the organic phase. The organic phase can then be treated with HCl so as to obtain an aqueous composition comprising the aluminum ions. The aluminum ions can be converted into $Al(OH)_3$ by contacting it with a base. $Al(OH)_3$ can then be converted into $Al_2O_3$. Such a conversion of $Al(OH)_3$ into $Al_2O_3$ can be carried out at a temperature of about 800° C. to about 1200° C.

BRIEF DESCRIPTION OF DRAWINGS

In the following drawings, which represent by way of example only, various embodiments of the invention.

DETAILED DESCRIPTION OF VARIOUS EMBODIMENTS

Figure 1:
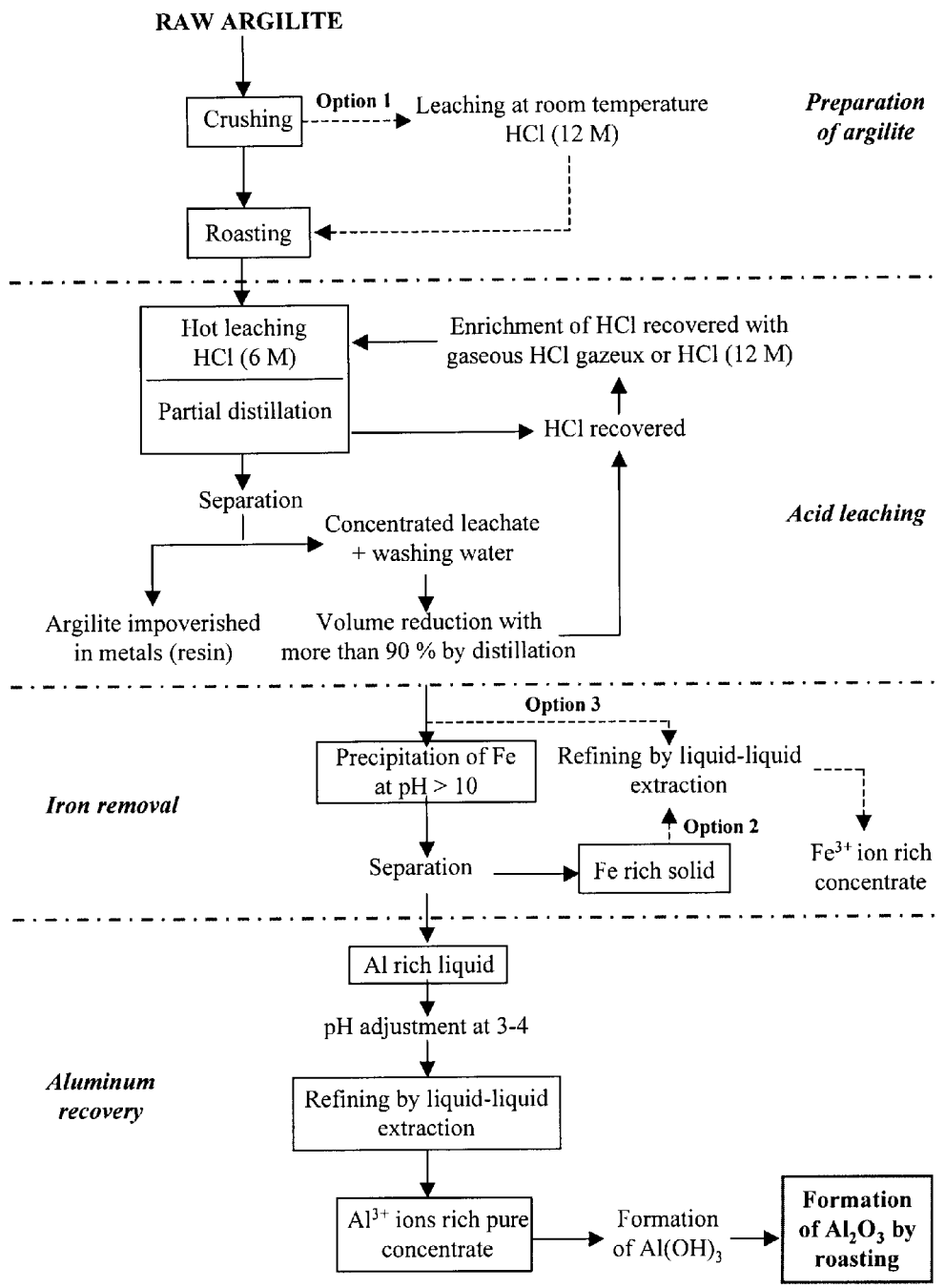
FIG. 1 shows a bloc diagram of a process according to one embodiment of a process for extracting aluminum from an aluminous ore.

Further features and advantages will become more readily apparent from the following description of various embodiments as illustrated by way of examples only in the appended drawings wherein:

As it can be seen from FIG. 1, such a process can comprise various steps, and each of these steps can eventually be individually considered has being a process.

Preparation of Argillite Sample

Argillite can be finely crushed in order to help along during the following steps. For example, micronization can shorten the reaction time by few hours (about 2 to 3 hours). In order to remove most of the iron, a leaching step at room temperature is optionally carried out between the crushing step and the roasting step (see option 1). This operation is, for example, carried out with hydrochloric acid HCl (12 M) and an argillite/acid ratio (weight/volume) of 1:5 is used. Depending on experimental conditions (sizes of the particles, time of treatment, agitation system), about 65% to about 93% of the iron can then be removed. However, this leaching step can also bring in a certain percentage of the aluminum (0-5%). The last step of the preparation of argillite comprises roasting the pretreated argillite. This can be accomplished at a temperature greater than 550° C. for a period of about 1 to 2 hours. For example, a heat treatment makes it possible to increase the quantity of extracted aluminum by about 30% to about 40% for the same period of time. In others words, the quantity of extracted aluminum is doubled. When leaching at room temperature is carried out, a phase separation before roasting can be made in order to recover the acid and reduce heating costs.

Acid Leaching

Acid leaching comprises reacting the crushed and roasted argillite with a hydrochloric acid solution at elevated temperature during a given period of time. For example, the argillite/acid ratio can be of about of 1:10 (weight/volume), the HCl concentration can be of about 6 M, the temperature can be of about 100° C. to about 110° C., and the reaction time can be of about 5 to about 7 hours. Under such conditions, more than about 90% of the aluminum and about 100% of the iron can be extracted in addition to impurities.

During the second half of such a treatment (for example the last 2 or 3 hours), a portion of the acid can be recovered by condensation. Once the extraction is terminated, the solid (argillite impoverished in metals) can be separated from the liquid by decantation or by filtration, after which it is washed. The residual leachate and the washing water may be completely evaporated. The corresponding residue can thereafter be washed many times with water so as to decrease acidity and to lower the quantities of sodium hydroxide (NaOH) that are required to adjust the pH during iron removal. Final volume accounts for 10% to 20% of initial volume. The acid recovered will can be re-utilized after having adjusted its titer either by adding gaseous HCl, or by adding concentrated HCl (12 M). After the reaction, the titer of the acid can vary from about 4 M to about 6 M depending on experimental conditions. With respect to the solid, it represents about 65% to about 75% of the initial mass of argillite, it can be valorized and be used again either as an ion exchange resin, or as an adsorbent.

Removal of Iron

Removal of iron can be carried out by precipitation of the latter in basic medium for example at a pH of at least 10 or at a pH of about 11.5 to about 12.5. Such a step can be made by adding NaOH, for example at a concentration of 10 M. Other bases such as KOH can also be used. Then, all that is required is to separate the solid portion from the liquid portion by filtration, decantation or centrifugation and to rinse the solid by means of a diluted base, such as a solution of NaOH (for example NaOH at a concentration of 0.01 M to 0.02 M). Then, the solid is washed with distilled water. The liquid portion comprises aluminum and alkaline-earths A substantially complete removal of the iron and of nearly all the impurities (other metals) can thus be achieved. Optionally, it is possible to recover iron by using a refining step by liquid-liquid extraction through a hollow fiber membrane (see option 2).

Alternatively (see option 3), removal of iron can be carried out by using an extracting agent and a hollow fiber membrane. Various extracting agents that could substantially selectively complex iron ions over aluminum ions (or aluminum ions over iron ions) could be used in such a step depending an Al/Fe ratio. For example, extraction can be carried out by using HDEHP (diethylhexylphosphoric acid) as an extracting agent adapted to complex iron ions. A concentration of about 1 M of HDEHP can be used in an organic solvent, such as heptane or any hydrocarbon solvent. Such an extraction can require relatively short contact times (few minutes). For example, the pH of the order of 2 can be used and aqueous phase/organic phase ratio can be of about 1:1. It was observed that is possible to extract from 86% to 98% iron under such conditions. It will be understood that in the present case, iron is trapped in the organic phase. To recover iron in an aqueous phase, a reverse extraction with hydrochloric acid (2 M or 6 M) and organic phase/acidic phase ratio of about 1:0.5 can then be carried out. In such a case, the resulting aqueous phase is rich in $Fe^{3+}$ ions.

Aluminum Recovery

The solution obtained from the previous step using either the precipitation or the extraction technique is relatively clean and mainly contains aluminum for example about 90% to 95% (without the alkaline-earths in the case of precipitation). Recovery of the latter can be carried out by liquid-liquid extraction for example by using a same hollow fiber membrane and an extracting agent that is adapted to complex at least substantially selectively aluminum over other metals or residues. For example, bis(2,4,4-trimethylpentyl) phosphinic acid (such as the one sold under the name Cyanex™ 272) can be used as an extracting agent specific to aluminum. For example, this extracting agent can be used at a concentration of about 20% v/v in an organic solvent such as heptane. The ratios between the aqueous phase and the organic phase can be of about 1:1 to about 1:3. For example, the extraction temperatures can be of about 40° C. and the pH can be maintained at about 2.5 to about 3.5. It was observed that such a technique makes it possible to extract more than 70-90% of the aluminum. After the aluminum has been trapped in the organic phase, it can be recovered in the form of a concentrate of $Al^{3+}$ ions by using a back extraction. For example, the reverse extraction can be carried out at a temperature of about 40° C. with hydrochloric acid (for example at a concentration of 6 M). Under this condition, more than 90% of aluminum can be recovered. Then, $Al^{3+}$ can be converted into aluminum hydroxide $Al(OH)_3$ by addition of NaOH. Finally, $Al(OH)_3$ can be converted into alumina (alumina $Al_2O_3$) by roasting $Al(OH)_3$ for example at a temperature of about 800° C. to 1200° C.

The following non-limiting examples further illustrate the invention.

EXAMPLES

Example 1

Preparation of Argillite Sample

Crushing of mudstone: The resulting micronization average employed for the tests ranges between 10 and 50 microns.

Roasting: Crushed mudstone was roasted at least during 1 hour at a temperature of 600° C. Its average composition was:

| | |
|---|---|
| $Al_2O_3$ | 21.0% |
| $Fe_2O_3$ | 8.0% |
| $K_2O$ | 1.5% |
| $Na_2O$ | 0.9% |
| $TiO_2$ | 0.9% |
| CaO | 0.08% |
| ZnO | 0.06% |
| $SiO_2$ | 51.0% |

Acid Leaching 500 g of argillite crushed and roasted were added to 5 liters of hydrochloric acid 6 M. The mixture was then heated at 100° C.-110° C. during 7 hours.

After reaction, the liquid part was separated from the solid part by filtration. The solid was washed with distilled water which was added to the liquid portion. This washing makes it possible to recover part of the aluminum trapped in the solid. This solid had a dry mass of 345±−5 g, which corresponds to a loss of about 30%-32%.

The remaining liquid part, containing aluminum, iron and a great part of the impurities initially present in mudstone, was reduced by evaporation at a temperature of 100° C. to 90% of its initial volume. Residual volume was then 50 mL. The liquid compositions before and after evaporation were:

| | Leaching solution Composition (%) [concentration (mg/L)] | Evaporated leaching solution Composition (%) [concentration (mg/L)] |
|---|---|---|
| Aluminum | 47.63 [9 250] | 47.86 [59 500] |
| Iron | 31.54 [6 125] | 31.07 [38 625] |
| Alkaline-earths (Na, Mg, K, Ca) | 19.30 [3 749] | 19.53 [24 277] |
| Other metals | 1.53 [297.3] | 1.54 [1 920] |

All the ions species seem to remain soluble.

Removal of Iron

The residual volume was slightly diluted (+25%) and concentrated hydroxide sodium (10 M) was added until a pH higher than 11.5 was reached. The formed precipitate was separated from the solution by standard filtration and was washed several times with NaOH diluted and hot ultra-pure water. The precipitate contained all the iron and the majority of the metal impurities. The filtrate contained in addition to ions $Al^{3+}$ mainly alkaline-earths and some following impurities:

| | Major filtrate impurities (%) |
|---|---|
| Iron | 0.14 |
| Sodium | 94.13 |
| Alkaline-earths (Mg, K, Ca) | 5.71 |
| Other metals | 0.02 |

Na+ came from soda and was also the $Al(OH)_4^-$ counter-ion.

Aluminum Recovery

The filtrate is adjusted at a pH of 2.5 to 3.5 by addition of HCl 6 M. The resulting solution is extracted by means of the complexing agent, Cyanex 272, at a concentration of 20% volume/volume in an organic solvent with a volumetric ratio of 1:1. The extraction is carried out at a temperature of 40° C. in a membrane contactor with hollow fibers. In less than about 30 to 60 min, more than 85% of aluminum is extracted. The pH adjustment is performed by a regulation loop controlling the NaOH (10 M) addition. Complexed $Al^{3+}$ in Cyanex are then recovered by carrying out a back extraction with HCl (6 M) at 40° C. and an organic phase/acid phase volumetric ratio of 1:0.5. After the back extraction, the composition of the recovered acid phase is:

| | Composition (%) |
|---|---|
| Aluminum | 92.81 |
| Iron | 0 |
| Alkaline-earths (Na, Mg, K, Ca) | 7.14 |
| Other metals | 0.05 |

To increase the percentage of purity, the $Al^{3+}$ ions are precipitated in the form of $Al(OH)_3$ hydroxide, then washed several times with ultra-pure water. The composition of the hydroxide becomes:

| | Composition (%) |
|---|---|
| Aluminum | 99.09 |
| Iron | 0 |
| Alkaline-earths (Na, Mg, K, Ca) | 0.88 |
| Other metals | 0.03 |

Further purification can be performed by recrystallization

While a description was made with particular reference to the specific embodiments, it will be understood that numerous modifications thereto will appear to those skilled in the art. Accordingly, the above description and accompanying drawings should be taken as specific examples and not in a limiting sense.

What is claimed is:

1. A process for extracting aluminum ions from a mixture comprising iron ions and the aluminum ions, said process comprising recovering said aluminum ions from a composition comprising said aluminum ions, said iron ions, an acid, an organic solvent and an extracting agent adapted to form an organometallic complex substantially selectively with said iron ions or with said aluminum ions, said extracting agent being soluble in said organic solvent, wherein when said extracting agent is adapted to form an organometallic complex substantially selectively with said iron ions, said composition comprises an acidic aqueous phase comprising said aluminum ions and said acid, and an organic phase comprising said organic solvent and said iron ions complexed with said extracting agent, said aluminum ions are recovered by separating said aqueous phase from said organic phase by means of a hollow fiber membrane, and reacting said separated aqueous phase with a base, and wherein when said extracting agent is adapted to form an organometallic complex substantially selectively with said aluminum ions, said composition comprises an acidic aqueous phase comprising said iron ions and said acid, and an organic phase comprising said organic solvent and said aluminum ions complexed with said extracting agent, said aluminum ions are recovered by separating said aqueous phase from said organic phase by means of a hollow fiber membrane, reacting said separated organic phase with an acid so as to obtain another aqueous phase comprising said aluminum ions and another organic phase, separating said another aqueous phase from said another organic phase and recovering said aluminum ions in the form of $Al(OH)_3$ by reacting said another aqueous phase with a base.

2. The process of claim 1, wherein said extracting agent is adapted to form an organometallic complex substantially selectively with said iron ions.

3. The process of claim 2, wherein said acidic aqueous phase has a pH of about 1 to about 2.5.

4. The process of claim 2, wherein said extracting agent is chosen from di-2-ethylhexyl phosphoric acid (HDEHP), bis (2,4,4-trimethylpentyl) phosphinic acid and 2-ethylhexyl phosphonic acid mono-2-ethylhexyl ester).

5. The process of claim 4, wherein said organic solvent is chosen from $C_5$-$C_{12}$ alkanes and mixtures thereof.

6. The process of claim 5, wherein said separated aqueous phase is reacted with said base, said base comprises NaOH, KOH, or a mixture thereof.

7. The process of claim 6, further comprising a separation by filtration to recover $Al(OH)_3$.

8. The process of claim 1, wherein said extracting agent is adapted to form an organometallic complex substantially selectively with said aluminum ions.

9. The process of claim 8, wherein said acidic aqueous phase has a pH of about 2.5 to about 3.5.

10. The process of claim 8, wherein said extracting agent is a phosphinic acid or a derivative thereof.

11. The process of claim 9, wherein said extracting agent is bis(2,4,4-trimethylpentyl) phosphinic acid.

12. The process of claim 10, wherein said organic solvent is chosen from $C_5$-$C_{12}$ alkanes and mixtures thereof.

13. The process of claim 1, wherein said another aqueous phase is treated with said base so as to obtain a pH of at least about 4.

14. The process of claim 13, further comprising a separation by filtration at in order to recover $Al(OH)_3$.

15. A process for at least partially separating aluminum ions from iron ions comprised in a composition, said process comprising substantially selectively precipitating at least a portion of said iron ions under basic conditions in which the pH is at least 10, and purifying the precipitated at least a portion of said iron ions by means of a hollow fiber membrane.

16. A process for extracting aluminum from aluminous ore, said process comprising:
 leaching said aluminous ore with an acid so as to obtain a leachate and a solid residue, and separating said leachate from said solid residue;
 removing at least a portion of iron ions contained in said leachate by reacting said leachate with a base in order to obtain a pH of at least 10 and substantially selectively precipitating said at least a portion of said iron ions and separating said precipitated at least a portion of said iron ions from said leachate so as to obtain an aluminum enriched composition.

17. The process of claim 16, wherein said acid is HCl.

18. The process of claim 16, wherein said aluminous ore is leached with HCl at a temperature of at least 80 ° C.

19. The process of claim 16, wherein removal of said at least portion of iron ions is carried out by substantially selectively precipitating said iron ions from a basic aqueous composition comprising NaOH, KOH, or a mixture thereof.

20. The process of claim 19, wherein said precipitated at least a portion of iron ions is separated from said leachate by carrying out a filtration, a decantation, a centrifugation, or mixtures thereof.

21. The process of claim 19, wherein said pH is about 10.8 to about 11.2.

22. The process of claim 19, wherein said pH is about 11.5 to about 12.5.

23. The process of claim 20, further comprising purifying said precipitated at least a portion of iron ions by means of a hollow fiber membrane.

24. The process of claim 8, wherein said separated organic phase is reacted with HCl so as to obtain another aqueous phase comprising said aluminum ions and another organic phase.

* * * * *

UNITED STATES PATENT AND TRADEMARK OFFICE
CERTIFICATE OF CORRECTION

PATENT NO. : 7,837,961 B2  
APPLICATION NO. : 12/601079  
DATED : November 23, 2010  
INVENTOR(S) : Richard Boudreault et al.

Page 1 of 1

It is certified that error appears in the above-identified patent and that said Letters Patent is hereby corrected as shown below:

On the cover page, item (75),

The name of the third inventor Fabienne Sotto should read -- Fabienne Biasotto --

On Column 10, Line 5 "... by filtration at in order..." should read --"... by filtration in order..."-

Signed and Sealed this

Twenty-eighth Day of June, 2011

David J. Kappos  
*Director of the United States Patent and Trademark Office*